United States Patent [19]

Hahn et al.

[11] Patent Number: 5,074,062

[45] Date of Patent: Dec. 24, 1991

[54] METHOD OF REPLACING A WORN EXCAVATING TOOTH POINT

[75] Inventors: Frederick C. Hahn, Aloha; Kirk E. Yoresen, Beaverton; William A. Fewless, Portland; Robert K. Emrich, Portland; Michael J. Secrist, Portland, all of Oreg.

[73] Assignee: Esco Corporation, Portland, Oreg.

[21] Appl. No.: 580,850

[22] Filed: Sep. 10, 1990

[51] Int. Cl.⁵ .............................................. E02F 9/28
[52] U.S. Cl. .................................. 37/142 A; 37/141 T; 403/379; 403/2; 403/318; 172/713; 172/751
[58] Field of Search ............ 37/141 R, 141 T, 142 R, 37/142 A; 172/713, 750–751, 772.5; 299/91–93; 403/379, 2, 318

[56] References Cited

U.S. PATENT DOCUMENTS

| 564,664 | 7/1896 | Trim et al. | 37/142 R |
|---|---|---|---|
| 3,121,289 | 2/1964 | Eyolfson | 37/142 R |
| 3,440,745 | 4/1969 | Palm | 37/141 R |
| 3,520,076 | 7/1970 | Nichols | 37/141 R |
| 3,832,074 | 8/1974 | Von Mehren | 403/379 |
| 4,187,035 | 2/1980 | Colburn | 37/141 R X |
| 4,231,173 | 11/1980 | Davis | 37/142 R |
| 4,335,532 | 6/1982 | Hahn | 37/142 R |
| 4,404,760 | 9/1983 | Hahn et al. | 37/142 R |
| 4,501,079 | 2/1985 | Hahn et al. | 37/141 R |
| 4,577,423 | 3/1986 | Hahn | 37/142 R |
| 4,602,445 | 7/1986 | Nilsson | 37/142 A |
| 4,716,667 | 1/1988 | Martin | 37/142 R |
| 4,761,900 | 8/1988 | Emrich | 37/142 R |

Primary Examiner—Dennis L. Taylor
Assistant Examiner—Franco S. De Liguori
Attorney, Agent, or Firm—Tilton, Fallon, Lungmus & Chestnut

[57] ABSTRACT

A method of replacing a worn point of an excavating tooth wherein the point is held in place by a pin lock including a shearable top flange and torque-resisting, forwardly extending rib, the method including exerting a downward force on the pin lock to shear the top flange while the forwardly extending rib guides the pin lock downwardly and out of locking engagement with aligned slots in the tooth adapter nose and point rearwardly extending ear, removing the worn point and installing a new point along with a new pin lock including a top flange and forwardly extending rib.

6 Claims, 3 Drawing Sheets

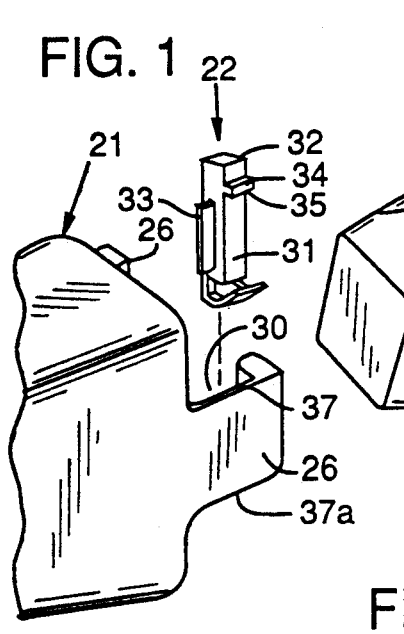
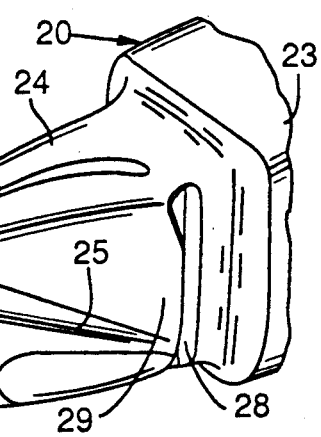
FIG. 1
FIG. 2
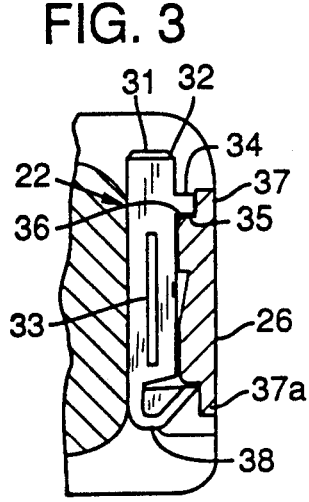
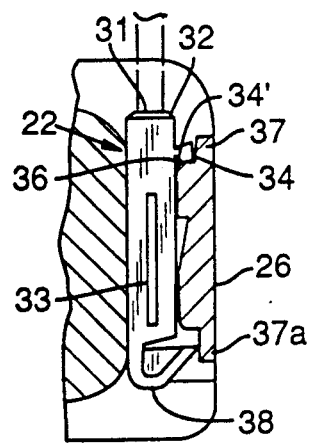
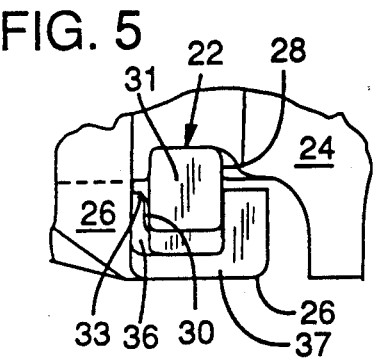
FIG. 3
FIG. 4
FIG. 5
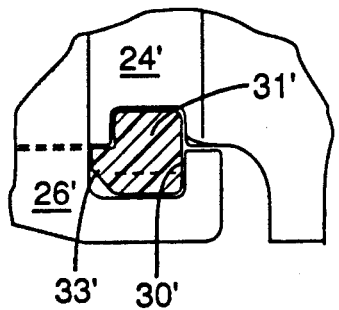
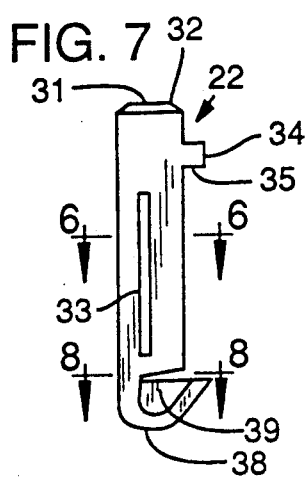
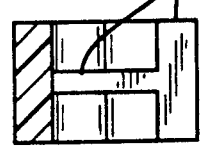
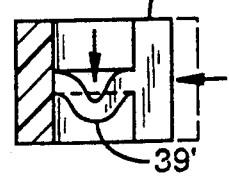
FIG. 6
FIG. 7
FIG. 8
FIG. 9

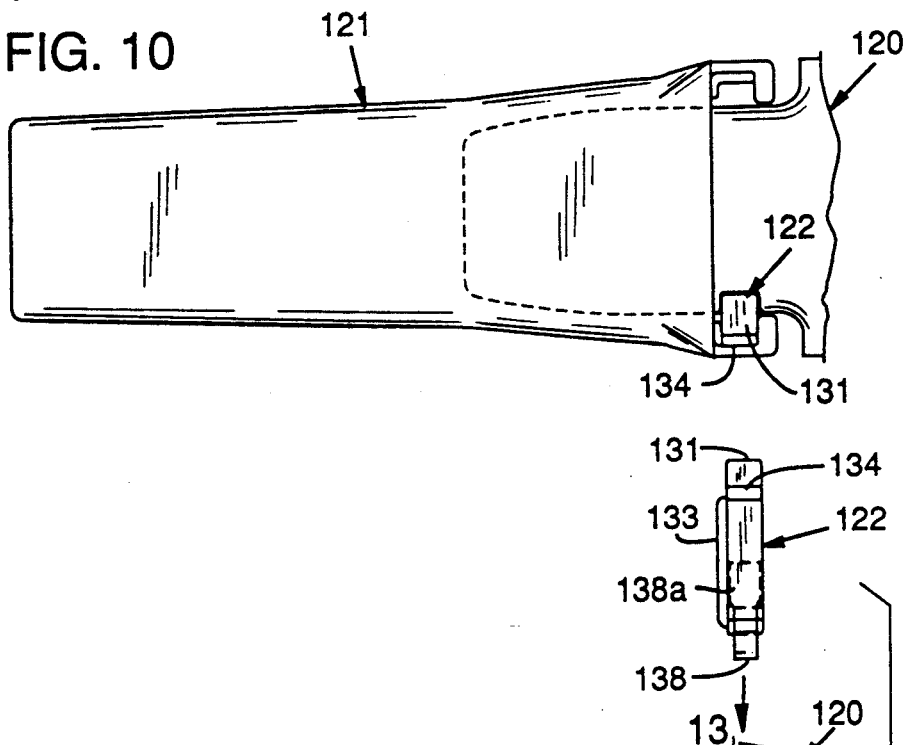
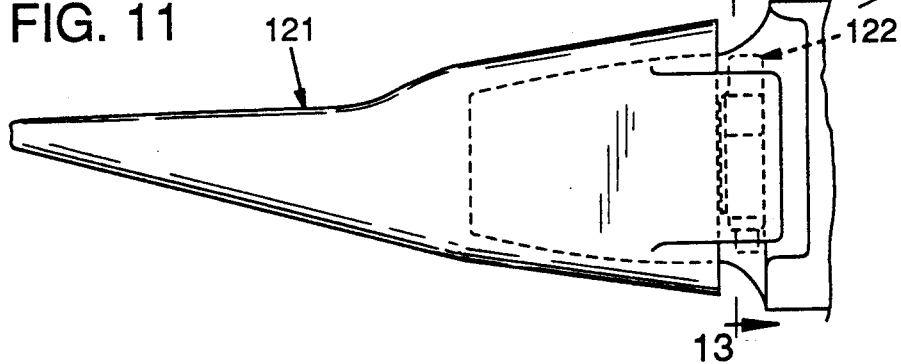
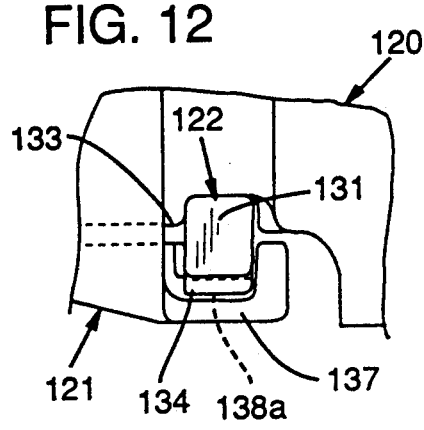
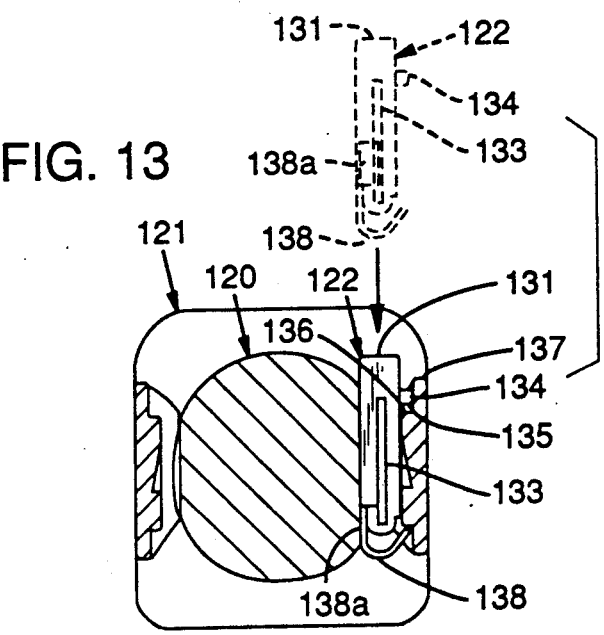

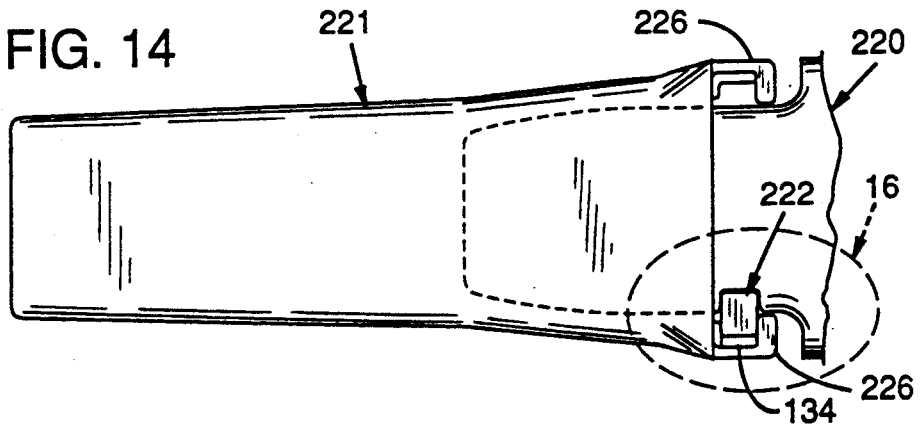
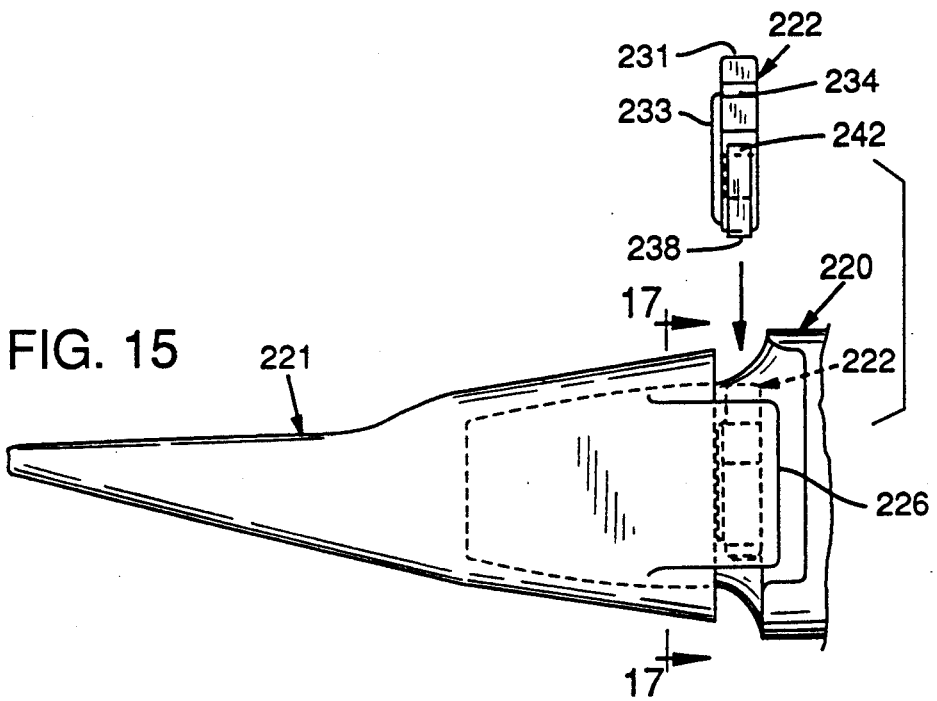
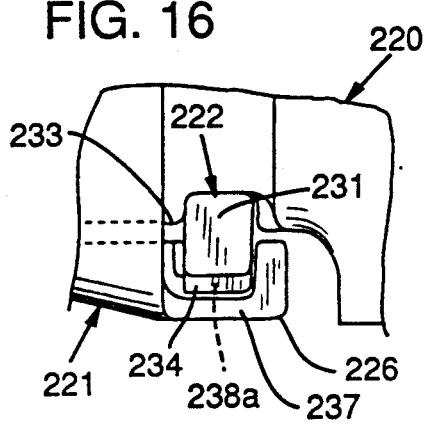
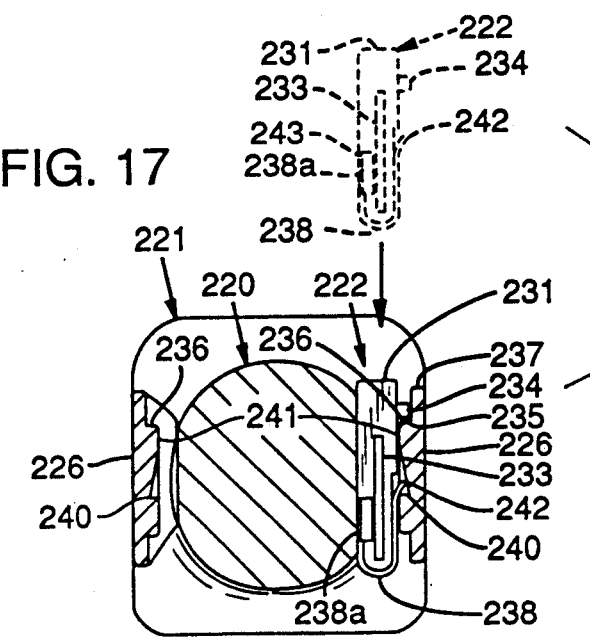

5,074,062

METHOD OF REPLACING A WORN EXCAVATING TOOTH POINT

BACKGROUND AND SUMMARY OF INVENTION

This invention relates to a method for replacing a worn excavating tooth point and, more particularly, to the use during installation of a novel locking pin means.

Since before the turn of the century, excavating teeth have included replaceable points mounted on adapters which, in turn were secured to the digging edge of an excavator. Depending upon the type of excavation, a given adapter can be successively equipped from anywhere from 5 to 30 points to maintain sharp penetrating edges. Historically, the point and nose of the adapter were equipped with vertically aligned openings in which a locking pin was received. An early version is seen in U.S. Pat. No. 564,664. In the early 1980's a new form for securing the point to the adapter was developed as shown in co-owned U.S. Pat. No. 4,335,532. This made use of helical thread means on the point nose and adapter socket with a side-mounted pin means. Subsequently, for smaller sizes of teeth, the pin means was dispensed with and detent means were provided on rearwardly extending tongues as seen in co-owned U.S. Pat. No. 4,557,423. For the larger sizes, an improved side lock was provided as seen in co-owned U.S. Pat. No. 4,761,900. We have now found that certain of the smaller sizes function better with modified side pin lock means as described hereinafter.

It will be appreciated that the securement of the point on the adapter is a compromise between two opposing demands. The way of securing must be strong enough during the excavating operation so as to maintain the point on the adapter against the tremendous shock loads encountered. Yet, when replacement is necessary, the means for securement must be readily removed. It will be further appreciated that often the replacement is performed under rather primitive conditions in the field where no assistance equipment is available. Typically, the locking pin has to be removed with only a hammer and drift pin which makes it difficult to overcome a tightly held securement.

According to the invention, the balance of opposing requirements is achieved through the provision of a novel locking pin for side mounting where the pin is readily removed by shearing a sidewardly extending upper flange. However, during operation, the pin provides means in the form of a forwardly extending rib which counteracts any twisting tendency in its assembly in the point and the adapter which would tend to bring about undesirable removal, and means in the form of a resilient hook which counteracts any dislodgement tendency.

Other advantages and details of operation can be seen in the ensuing specification.

The invention is described in conjunction with the accompanying drawing, in which FIG. 1 is a fragmentary exploded view of one embodiment of the invention;

FIG. 2 is a fragmentary side elevational view of the elements of FIG. 1 in assembled condition;

FIG. 3 is a fragmentary sectional view such as would be seen along the sight line 3—3 of FIG. 2;

FIG. 4 is a view similar to FIG. 3 but with the parts thereof during disassembly;

FIG. 5 is a fragmentary top plan view such as would be seen along the sight line 5—5 applied to FIG. 2;

FIG. 6 is a view similar to FIG. 5 but of a modified form of pin lock;

FIG. 7 is a front elevational view of the pin means seen in perspective in FIG. 1;

FIG. 8 is an enlarged sectional view taken along the sight line 8—8 applied to FIG. 7;

FIG. 9 is a view similar to FIG. 8 but showing flexing of a lower web incident to installation;

FIG. 10 is a top plan view of an assembled tooth featuring a further modified form of pin means;

FIG. 11 is an exploded side elevational view of the assembly of FIG. 10;

FIG. 12 is an enlarged top plan view of the portion encircled in FIG. 10;

FIG. 13 is a sectional view such as would be seen along the sight line 13—13 applied to FIG. 11 and wherein the locking pin is also shown in spaced or exploded position;

FIG. 14 is a top plan view of a tooth assembly featuring yet another pin lock of the invention;

FIG. 15 is an exploded side elevational view of the assembly of FIG. 14;

FIG. 16 is an enlarged top plan view of the encircled portion of FIG. 14; and

FIG. 17 is a sectional view seen along the sight line 17—17 applied to FIG. 15.

DETAILED DESCRIPTION

In the illustration and reference first to FIG. 1, the numeral 20 designates generally an adapter, the numeral 21 generally designates a point and the numeral 22 generally designates pin lock means. The adapter 20 has a shank portion 23 which normally is bolted, welded, etc. to the lip of an excavator (not shown). Extending forwardly from the shank 23 is the adapter nose 24 which is constructed generally in accordance with the teachings of U.S. Pat. No. 4,335,532, having a plurality of helical threads as at 25. The point 21 has rearwardly extending tongues or ears as at 26—still referring to FIG. 1—which cooperate with the adapter in receiving the pin lock means 22. This can be seen more clearly from a consideration of FIGS. 2-5.

Referring now to FIG. 2, it is seen that the nose 24 is received within a conforming socket 27 at the rear end of the point 21. More particularly, the nose has exterior top, bottom and sidewalls in conventional fashion with the helical thread means 25 protruding therefrom. Likewise, in conventional fashion, the socket 27 has similar top, bottom and sidewalls which conform essentially to the exterior walls of the adapter nose 24.

Referring to FIG. 1, the numeral 28 designates a vertically extending slot in the sidewall 29 of the nose 24. This cooperates with the slot 30—still referring to FIG. 1—in the ear 26 of the point 21 for the receipt of the pin lock means 22—see also FIG. 5.

The pin lock means 22 of the embodiment of FIGS. 1-5 is seen to include a relatively elongated element 31 which is equipped with a top portion 32 and an integral forwardly extending rib 33 As can be seen from FIGS. 1 and 5 this rib 33 extends forwardly between the point and the nose to provide means to resist torque during the imposition of loads on the excavating tooth. The element 31 is constructed of nylon or other thermosetting plastic or of metal.

A modified construction is seen in FIG. 6 where a slightly different shape of rib means 33' is provided on the pin element 31'. As before, however, the pin element 31' is positioned within generally aligned slots 28' in the nose 24' and 30 in the point ear 26'. The rib means 33' is advantageously effective to prevent twisting of the point on the adapter.

In the embodiments of FIGS. 1-5 and FIG. 6, the pin locking means 22 near its upper end is equipped with a laterally projecting flange portion 34—see particularly FIG. 1. During operation, the underside 35 of the flange portion 34 bears against the upper surface of the ear 26 as seen in FIG. 3. Still further, the ear 26 (see FIG. 3) is equipped with an integral upstanding flange 37 which protects the pin locking means 22 under all types of service loads without interrupting installation and removal.

Still referring to FIG. 3, it will be seen that the pin 31 at its lower end is equipped with hook means 38 which extends laterally outwardly and under the ear 26. A depending flange 37a on the bottom of ear 36 protects the hook means 38. This hook means 38 serves to prevent inadvertent ejection of the pin lock means 22 during "jacking" or other shock forces. "Jacking" is a term used to describe what might be considered a fluttering of the point on the adapter when the excavating tooth is in its penetration and lifting mode. To develop suitable penetration, the lifting vector or aspect is relaxed slightly at times so that the point moves relative to the adapter slightly and operates against the pin lock means analogous to a hydraulic jack. A more detailed description of this phenomenon can be seen in co-owned U.S. Pat. No. 4,231,173.

FIGS. 3 and 4 illustrate the mode of removal of the pin lock means 22. When a downward force is applied on the top surface of the element 31, the flange 34 is ruptured as at 34' in FIG. 4. This permits the pin lock means 22 to move downwardly in the aligned slots 28, 30 and out of the bottom thereof, being guided by the rib 33. In the past, rupturable pin locks have been employed in conjunction with excavating teeth, as seen in U.S. Pat. No. 4,602,445. Alternatively, the pin could be reused by driving it up from the bottom by compressing the hook means 38.

When a new point is installed on the adapter nose 24, the pin lock means 22 is inserted partway into the aligned slots 28, 30. This flexes or deflects the web 39 from the unflexed condition (see FIG. 8) to the flexed condition 39' of FIG. 9. This is due to the compressive force indicated by the arrow at the left in FIG. 9 when the pin lock means enters the aligned slots. This compressive flexing permits the hook means 38 to snap back into position (as seen in FIG. 3) after the pin lock 22 is fully installed. During operation of the excavator, the hook means opposes jacking of the pin lock means by placing the web 39 in tension.

A modified form of pin lock means 122 can be seen in FIGS. 10-13. Here, we provide a metal member 131 which again has a forwardly extending rib 133. Still further, the metal pin lock 122 has an integral upper flange projecting laterally as at 134.

The metal lock 131 is equipped with a spring clip 138a (see particularly FIG. 13) which holds the pin 131 from jacking out. Regarding the mechanism of installation, holding and removal is the same as for the nylon pin 22. Again, the small tab or flange 134 shears during removal. The metal type spring clip 138a has a channel section clamping the same over the side of the pin 131 leading to the hook portion 138 at the bottom. As can be appreciated from a comparison on FIGS. 10-12, the point 121 is received on the adapter 120 in the same fashion as the embodiment illustrated in FIGS. 1-5.

Yet another form of pin lock means can be employed advantageously in the practice of the invention. This is designated by the numeral 222 as seen in FIGS. 14-17. This embodiment involves set-in notches as at 240 (see FIG. 17) on the interior faces 241 of the point ears 226. These receive the outwardly curved tip 242 of a hook portion 238 of a spring clip 238a which is attached to a steel pin 231 by virtue of a single leg 243 and the tip 242.

Again, the basic assembly consisting of the adapter 220 and point 221 is the same as that illustrated relative to the previous embodiments. Further, the metal pin 231 is equipped with the forwardly projecting flange 233 and the flange or tab 234.

OPERATION

In the operation of the invention for replacing a worn point of an excavating tooth, the exertion of a downward force as illustrated in the vertical arrow in FIG. 4 shears the laterally extending flange 34 (see FIG. 4) as illustrated in FIG. 4 at 34'. This enables the pin lock means 22 to be forced out of the bottom the aligned generally rectangular slots—28 in the sidewall 29 of the nose 24 and the slot 30 on the interior of the rearwardly extending ear 26 of the point 21—see FIG. 1 for construction details. In like fashion the flange 134 of the alternative pin lock means modification of FIGS. 10-13 can be sheared off. Still further, the flange means 234 of the embodiment of FIGS. 14-17 operates in the same fashion.

For removal of the worn point, the same is rotated slightly on the thread means 25 sufficient to permit longitudinal movement or translation of the point 21 on the nose 24. Thereafter, the worn point is removed either for discarding or repair, as the case may be, and a new point is installed on the nose 24 by first longitudinal and thereafter rotational movement to bring about alignment of the slots 28, 30.

With the aligned slots, a new pin lock means 22, 122 or 222 can be installed with the forwardly extending rib 33, 133 or 233 positioned between the ear 26 and the nose 24. The exertion of a downward force on the upper end of the new pin lock means drives the forwardly extending rib 33, 133 or 233 into guiding engagement with the nose and point. The exertion of the downward force is continued until the bottom wall 35, 135 or 235 of the laterally extending flange 34, 134 or 234 engages the top wall 36, 136 or 236 of the ear 26. During this time in the embodiment of FIGS. 1-9, the web 39 of the hook means 38 flexes (compare FIGS. 8 and 9) to permit the hook means 38 to pass through the aligned slots and snap into the position seen in FIG. 3. The hook means 38 and flange 34 are spaced apart a distance approximately the vertical dimension of the aligned slots so that hook means can engage the underside of the ear 26 and prevent jacking expulsion of the pin lock means by placing the web 39 in tension.

The same operation is performed relative to the second and third embodiments wherein the spring-like hook member 138 or 238, as the case may be, flexes to pass through the aligned slots and snaps into the position seen in FIGS. 13 and 17. In the case of the embodiment of FIG. 17, the hook portion 238 is relatively elongated and equipped with an outwardly curved tip 242 and snaps into the inset notch 240 on the interior face 241 of the point ear 226. Notches are provided in both ears 226 to accommodate reversal of the point 226, i.e., rotation 180° about the longitudinal axis thereof.

While in the foregoing specification a detailed description of the invention has been set down for the purpose of explanation, many variations of the details hereingiven may be made by those skilled in the art without departing from the spirit and scope of the invention.

We claim:

1. A method of replacing the worn point of an excavating tooth having the point releasably pinned to the side of an adapter wherein said adapter is a relatively elongated unitary metal body having a forwardly projecting nose at one end, said nose being defined by upper and lower walls flanked by slightly forwardly convergent sidewalls, said adapter nose having a plurality of helical thread means projecting outwardly thereof, said adapter having a shank portion rearwardly of said nose for mounting said adapter on excavating equipment, at least one of said nose sidewalls forward of said shank portion being equipped with a vertical extending, outwardly facing slot having a generally rectangular cross section, said worn point being a generally wedge shaped, relatively elongated unitary metal body having a digging edge at its forward end and a socket extending forwardly from its rear end, said socket having interior walls conforming to said nose side, upper and lower walls and said thread means, at least one of said point sidewalls having an integral projection extending rearwardly of the point rear end, said projection having an upper wall and a vertically extending, inwardly facing slot having a generally rectangular cross section with said nose and point slots being generally aligned and with elongated pin means mounted in said aligned slots, said pin means having a generally square cross section defined by forward, rear inner and outer sidewalls, said forward wall being equipped with integral, longitudinally extending twist-resistive rib means, said rib means being confined between said point projection and said nose one sidewall, the upper end of said pin means being equipped with flange means projecting laterally outwardly of said pin means outer sidewall, and said flange having a bottom wall bearing against said worn point upper wall of said projection, the method comprising:

exerting a force on an end of said pin means to drive said pin means vertically and continuing to exert said force until said pin means is completely removed from said aligned slots, rotating said worn point on said thread means sufficient to permit longitudinal translation of said point on said nose, removing said worn point from said nose and providing a new point also having a projection providing an upper wall and a vertically extending, inwardly facing slot, installing said new point thereon by first longitudinal and thereafter rotational movement relative to said nose to generally align the slots of said adapter and said new point, reinstalling a new pin means in the aligned slots of said adapter and said new point with said new pin means again having longitudinally extending rib means for confinement between said point and adapter and a flange projecting laterally outwardly of said new pin means outer sidewall, and exerting a downward force on said reinstalled new pin means upper end to drive said rib means into guiding engagement with said nose and point and to place the bottom wall of said flange in bearing engagement with said upper wall of said new point projection.

2. The method of claim 1 in which force exerted on the end of said pin means to remove the same from said aligned slots of said adapter and worn point also shears off said flange.

3. The method of claim 1 in which said reinstalled new pin means is equipped with hook means at its lower end, said hook means projecting laterally outwardly of said pin means outer sidewalls, and said method further comprising compressively flexing said hook means incident to driving said new pin means into said aligned slots, said hook means opposing jacking of said pin.

4. The method of claim 3 in which said reinstalled new pin means includes a unitary plastic element, said hook means includes an intermediate flexible web, said hook means opposing jacking by placing said web in tension.

5. The method of claim 3 in which said new pin means includes a metal element having hook means clamped thereto, said hook means having an upper end, said step of compressively flexing said hook means bringing said upper end thereof adjacent one of said new pin means outer sidewalls.

6. The method of claim 5 in which said hook means upper end is snapped into a notch in the interior wall of said new point integral projection.

* * * * *